United States Patent Office 2,855,414
Patented Oct. 7, 1958

2,855,414

PREPARATION OF STEROID SUBSTANCES

John Francis Oughton, London, Patrick Gadsden Jones, Hillingdon, and John Christopher Hamlet, Pinner, England, assignors to G. N. R. D. Patent Holdings Limited, London, England, a British company No Drawing. Application August 2, 1954
Serial No. 447,394

Claims priority, application Great Britain August 7, 1953

7 Claims. (Cl. 260—397.45)

This invention is concerned with improvements in or relating to the preparation of 3-keto-$\Delta^4$-steroids from 3-keto-2-iodo-$\Delta^4$-steroids and to the preparation of the said 3-keto-$\Delta^4$-steroids from 3-keto-2:4-dibromoallosteroids using the said 3-keto-2-iodo-$\Delta^4$-steroids as intermediates.

It will be appreciated that cortisone contains the 3-keto-$\Delta^4$-structure and accordingly where the starting materials used in the present process have an 11-keto group and the cortisone side-chain or derivative thereof, for example having 21- or 17- and 21-ester groups, the present process leads to the production of cortisone or its derivatives. The present process is therefore valuable in the synthesis of cortisone. The formation of the 3-keto-$\Delta^4$-structure is also of importance in the synthesis of other steriods of physiological importance.

The conversion of 3-keto-2:4-dibromoallosteriods into 3-keto-2-iodo-$\Delta^4$-steriods by reaction with sodium iodide in acetone and the reduction of this latter type of compound by chromous chloride, collidine or zinc and acetic acid, to the 3-keto-$\Delta^4$-structure has been described by Rosenkranz, Mancera, Gatica and Djerassi (J. Amer. Chem. Soc., 1950, 72, 4077). In a later publication, Rosenkranz, Djerassi, Yashin and Pataki (Nature, 1951, 168, 28) have described the application of this process to the preparation of cortisone-21-acetate from 2:4 - dibromo-17-hydroxy-21-acetoxy-3:11:20-triketoallopregnane. In pending application Serial No. 441,686, filed July 6, 1954, there has been described an improved method for carrying out the first stage of the process of Rosenkranz et al., that is the formation of the 3-keto-2-iodo-$\Delta^4$-steroids, in which a compound is present in the formation of the said iodo-compounds which contains an active iodine atom which is capable of reacting with the hydrogen iodide liberated in the formation of the said 3-keto-2-iodo-$\Delta^4$-steroids under the conditions of the reaction. The compound containing an active iodine atom is preferably generated in situ by the presence in the reaction medium of a compound containing an active chlorine or bromine atom which will be replaced by an iodine atom during the reaction by reaction with hydrogen iodide released. The step of including a compound containing an active iodine atom in the reaction was based upon the observation that hydrogen iodide liberated during the iodide treatment brought about reduction of the bromine atom in the 4-position of the 3-keto-2:4-dibromoallosteroids used as starting materials in our said copending application, with the formation of 3-keto-4:5-dihydroallosteroids. The formation of such reduced compounds led to poor yields of the desired 3-keto-$\Delta^4$-steroids and we have found that using the process of our said copending application improved yields of the 2-iodo-compounds can be obtained with subsequent enhancement of the overall yield of 3-keto-$\Delta^4$-steroids.

In the conversion of 3-keto-2:4-dibromoallosteroids to 3-keto-$\Delta^4$-steroids by means of 2-iodo intermediates the latter have hitherto been isolated; we have now found an improved process for the preparation of 3-keto-$\Delta^4$-steroids from 3-keto-2:4-dibromoallosteroids wherein the isolation of such iodo-compounds may be avoided. Our invention is based upon the discovery that hydrogen iodide is effective in reducing the iodine atom from the 3-keto-2-iodo-$\Delta^4$-intermediates with the formation of the desired 3-keto-$\Delta^4$-steroids and that the hydrogen iodide can conveniently be liberated by acidification of the reaction mixture preferably after substantially complete formation of the 3-keto-2-iodo-$\Delta^4$-compound has taken place, for example, by refluxing the 3-keto-2:4-dibromoallosteroid for the appropriate time with, for example, sodium iodide, the hydrogen iodide being liberated by reaction with excess sodium iodide present. The presence of hydrogen iodide during the actual formation of the 2-iodo-compounds is, as stated, undesirable, since it causes reduction of the 2:4-dibromo starting materials to 4:5-dihydro compounds. Thus it is preferable to introduce hydrogen iodide into the reaction when formation of the intermediate 2-iodo compound is substantially complete.

According to the present invention, therefore, we provide a process for the preparation of 3-keto-$\Delta^4$-steroids by reduction of 3-keto-2-iodo-$\Delta^4$-steroids in which hydrogen iodide is used as reducing agent.

According to a feature of the invention we provide a process for the preparation of 3-keto-$\Delta^4$-steroids by the treatment of 3-keto-2:4-dibromoallosteroids with excess of an alkali metal iodide soluble in the reaction medium, in which hydrogen iodide is formed in the reaction medium containing 3-keto-2-iodo-$\Delta^4$-steroids obtained by the said iodide treatment and excess alkali metal iodide, by adding a non-oxidising acid thereto to liberate hydrogen iodide from said excess alkali metal iodide.

According to a further feature of the invention, the said alkali metal iodide is sodium iodide.

The 3-keto-2-iodo-$\Delta^4$-steroid may be formed by the reaction of the corresponding 3-keto-2:4-dibromoallosteroid with, for example sodium iodide in acetone, as described by Rosenkranz et al. (loc. cit.) or preferably under the conditions described in copending application No. 441,686, filed July 6, 1954. The appropriate acid is then added to the reaction mixture and when reduction of the 2-iodo compound is complete, the iodine formed is removed, for example, with sodium thiosulphate and the product, the desired 3-keto-$\Delta^4$-steroid, isolated.

The function of the acid in the reaction according to the present invention is solely to liberate hydrogen iodide, which will then act as a reducing agent, from the excess alkali metal iodide present during the formation of the 3-keto-2-iodo-$\Delta^4$-steroid and consequently an acid which will react with alkali metal iodide in the medium in which the reaction is being carried out with the formation of hydrogen iodide must be chosen. As to whether hydrogen iodide has been liberated on the addition of any particular acid to an alkali metal iodide in the chosen medium may be readily tested by adding a compound containing an active iodine atom, e. g. iodoacetone, to the mixture when formation of iodine will be observed if hydrogen iodide is present.

The acid should in general either be stronger than hydrogen iodide in the particular reaction medium in question or should form an alkali metal salt which is insoluble in the reaction medium, in which case the hydrogen iodide will be formed by metathesis. It is generally convenient to employ an acid, the alkali metal salts of which will be insoluble in the reaction medium. Acids which are strong oxidising agents, such as nitric, perchloric and chromic acids are excluded as they tend to have a deleterious effect on the steroids. Thus acids which may for example be used are oxalic acid, tartaric acid or hydrochloric acid.

The amount of acid added should be sufficient to liberate a quantity of hydrogen iodide at least equivalent to the amount of 3-keto-2-iodo-$\Delta^4$-steroid and any iodised compound, derived from the compound containing an active chlorine or bromine atom, for example, iodo-acetone, used in the process of copending application No. 441,686, filed July 6, 1954, during the formation of the said 3-keto-2-iodo-$\Delta^4$-steroid, present in the reaction mixture. The quantity of acid above this amount is not critical but a large excess should be avoided. It is, of course, also desirable that the amount of acid added should not be in excess of that which will react with the total amount of alkali metal iodide present in the reaction mixture.

The reaction may be carried out at any temperature within the range 10 to 100° C. Suitable solvents for the reaction are inert polar organic solvents such as those mentioned by Rosenkranz et al. (loc. cit.) and in our said copending application, namely acetone, methylethyl ketone, tertiary butanol, tetrahydrofuran and methyl cyanide, of which we prefer acetone.

In using the process according to the invention in the synthesis of cortisone, we prefer to prepare compounds in which the 21- or 17- and 21-hydroxyl groups are esterified, that is we prefer to use the 21-esters or 17:21-diesters of 17α:21 - dihydroxy - 2:4 - dibromo - 3:11:20-triketoallopregnane as starting materials.

According to a modification of the invention, therefore, the said 3-keto-2:4-dibromoallosteroid is a 21-ester or 17:21-diester of 17α:21 - dihydroxy - 2:4 - dibromo-3:11:20-triketoallopregnane.

In order that the invention may be well understood the following examples are given by way of illustration only:

Example 1

21-acetoxy-2:4-dibromo-17α-hydroxy-3:11:20 - triketoallopregnane (20.0 g.; 0.035 mole) in acetone (1 l.) containing sodium iodide (100 g.; 0.6 mole) and bromoacetone (9.6 g.; 0.07 mole; from 3.6 ml. bromine) was refluxed for 4½ hours. Commercial oxalic acid (20.0 g.; 0.16 mole) was then added and the refluxing continued for a further hour. The volume of the solution was reduced to ⅔ of its former bulk and the iodine colour removed by the addition of a solution containing sodium carbonate and sodium thiosulphate solution. After the addition of more water the product was extracted with ethyl acetate and the organic layer washed with water, dried and evaporated leaving crude cortisone-21-acetate, as a crystalline solid (13.1 g.), M. P. 207–213°, $[\alpha]_D^{20}+194°$ (chloroform). Light absorption:

$\lambda$ max. 237.5 m$\mu$, $E_{1cm.}^{1\%}$ 276

Example 2

17:21 - diacetoxy - 2:4-dibromo - 3:11:20 - triketoallopregnane (20 g.) in acetone (450 ml.) containing sodium iodide (100 g.) and bromoacetone (made from 3.4 ml. of bromine) was refluxed for 4½ hours. Commercial oxalic acid (20 g.) was then added and the mixture refluxed for a further hour. Ethyl acetate (1 l.) was added to the cooled solution which was filtered, and the filtrate washed with aqueous sodium bicarbonate and water. The ethyl acetate layer was decolourised by adding acetic acid (5 ml.) and shaking with zinc dust (25 g.). The mixture was filtered and the filtrate washed with aqueous sodium bicarbonate and water. Evaporation of the solvent from the ethyl acetate solution gave crude cortisone diacetate as a yellow solid (13.1 g.) M. P. 185–195°, $[\alpha]_D$ +103 (chloroform). Light absorption:

$\lambda$ max. 237.5 m$\mu$, $E_{1cm.}^{1\%}$ 250

Example 3

Sodium iodide (7.0 g.) was dissolved in refluxing acetone (30 ml.) and bromacetone (7 ml. prepared from bromine, (2.7 ml.) in acetone (75 ml.)) was added and the reflux continued for 15 minutes. 2:4-dibromodihydroallocortisone acetate (1.4 g.) was added and the reflux continued for a further 3½ hours. Tartaric acid (1.75 g.) was then added and the mixture allowed to reflux for another hour.

After cooling, ethyl acetate (30 ml.) was added and the mixture filtered. The filtrate was washed with water, aqueous sodium bicarbonate solution and finally water. The washings were re-extracted with ethyl acetate and the combined ethyl acetate solutions were decolourised with zinc dust (ca. 3.5 g.) and acetic acid (ca. 0.3 ml.). The product was filtered and the filtrate washed with water, aqueous sodium bicarbonate and finally water. After drying with magnesium sulphate the solution was evaporated to dryness under reduced pressure (0.96 g.).

$\lambda$ max. 238 m$\mu$, $E_{1cm.}^{1\%}$ 254

Iodine less than 1%.

Example 4

Example 3 was repeated except that instead of tartaric acid, hydrochloric acid (1.06 ml.) was used. Product 0.99 g.

$\lambda$ max. 238 m$\mu$, $E_{1cm.}^{1\%}$ 268

Iodine less than 3%.

We claim:

1. In a process for the introduction of the 3-keto-$\Delta^4$ system into a steroid compound selected from the group consisting of 21-esters and 17:21-diesters of the 17α:21-dihydroxy-2:4-dibromo-3:11:20-triketoallopregnane, said esters being derived from a lower alkanoic acid, which comprises reacting said steroid compound with excess of an alkali metal iodide to form the corresponding 3-keto-2-iodo-$\Delta^4$-steroid and reducing the latter, the step of introducing hydrogen iodide into the reaction medium after formation of the 3-keto-2-iodo-$\Delta^4$-steroid is substantially complete to effect said reduction.

2. A process as claimed in claim 1 in which the alkali metal iodide is sodium iodide.

3. A process as claimed in claim 1 wherein reaction of the 3-keto-2-iodo-$\Delta^4$-steroid with hydrogen iodide is effected at a temperature between 10° and 100° C.

4. In a process for the introduction of the 3-keto-$\Delta^4$ system into a steroid compound selected from the group consisting of 21-esters and 17:21-diesters of 17α:21-dihydroxy-2:4-dibromo-3:11:20-triketoallopregnane, said esters being derived from a lower alkanoic acid, which comprises reacting said steroid compound with excess of an alkali metal iodide in an inert polar organic solvent to form the corresponding 3-keto-2-iodo-$\Delta^4$-steroid and reducing the latter, the step of adding a non-oxidising acid to the reaction mixture, the alkali metal salt of which acid is substantially insoluble in the reaction medium, to form hydrogen iodide in the mixture to effect said reduction.

5. A process as claimed in claim 4 in which the said non-oxidizing acid is selected from the group consisting of oxalic acid, tartaric acid and hydrochloric acid.

6. A process as claimed in claim 4 wherein said inert polar solvent is selected from the group consisting of acetone, methyl ethyl ketone, tertiary butanol, tetrahydrofuran and methyl cyanide.

7. In a process for the introduction of the 3-keto-$\Delta^4$ system into a steroid compound selected from the group consisting of 21-esters and 17:21-diesters of 17α:21-dihydroxy-2:4-dibromo-3:11:20-triketoallopregnane, said esters being derived from a lower alkanoic acid, which comprises reacting said steroid compound with excess of an alkali metal iodide to form the corresponding 3-keto-2-iodo-$\Delta^4$-steroid and reducing the latter, the steps of introducing hydrogen iodide into the reaction mixture to reduce said 3-keto-2-iodo-$\Delta^4$ steroid and release iodine, removing said iodine by adding finely divided zinc and acetic acid, and isolating the desired 3-keto-$\Delta^4$-steroid.

References Cited in the file of this patent

Rosenkranz: Jour. Am. Soc. 72, 1046, 4077–80 (1950).
Rosenkranz: Nature 168, 28 (1951).
Fieser, et al.: Natural Products Related to Phenanthrene, 3rd ed., pp. 424–426 (1949).